(12) United States Patent
Bennett (10) Patent No.: US 8,444,034 B2
(45) Date of Patent: May 21, 2013

(54) UTV GUN MOUNT SYSTEM (76) Inventor: Steve Bennett, Westville, IL (US)

(*) Notice: Subject to any disclaimer, the term of this patent is extended or adjusted under 35 U.S.C. 154(b) by 282 days.

(21) Appl. No.: 13/007,726

(22) Filed: Jan. 17, 2011

(65) Prior Publication Data

US 2011/0198375 A1   Aug. 18, 2011

Related U.S. Application Data

(60) Provisional application No. 61/304,960, filed on Feb. 16, 2010.

(51) Int. Cl.
*B60R 9/00*     (2006.01)

(52) U.S. Cl.
USPC ........... 224/405; 224/544; 224/546; 224/913; 211/64; 89/37.04

(58) Field of Classification Search
USPC ............... 224/401–403, 405, 539, 543–562, 224/567–571, 913, 917.5; 211/64; 89/37.01, 89/37.04; 296/3
See application file for complete search history.

(56) References Cited

U.S. PATENT DOCUMENTS

| | | | |
|---|---|---|---|
| 2,251,271 A | 8/1941 | Del Campo | |
| 3,606,111 A * | 9/1971 | Gjesdahl | 224/321 |
| 3,792,805 A * | 2/1974 | Binding et al. | 224/321 |
| 3,876,078 A | 4/1975 | Gomes et al. | |
| 4,375,268 A * | 3/1983 | Speck | 224/556 |
| 4,995,537 A | 2/1991 | Thedieck | |
| 5,495,969 A | 3/1996 | Cardenas | |
| 5,544,798 A * | 8/1996 | Shumate et al. | 224/402 |
| 5,595,333 A * | 1/1997 | Boston | 224/536 |
| 6,484,913 B1 * | 11/2002 | Hancock et al. | 224/401 |
| 6,986,446 B2 | 1/2006 | Murray et al. | |
| 7,104,429 B1 * | 9/2006 | Flores | 224/405 |
| 7,137,511 B1 | 11/2006 | Crowell et al. | |

* cited by examiner

*Primary Examiner* — Nathan J Newhouse
*Assistant Examiner* — Scott McNurlen
(74) *Attorney, Agent, or Firm* — RG Patent Consulting LLC; Rachel Gilbry (57) ABSTRACT

A gun mounting apparatus for utility terrain vehicles comprising: a first inverted L-shaped tubular member comprising a first attacher, a second inverted L-shaped tubular member comprising a second attacher, an obliquely oriented tubular member having a first tubular member end and a second tubular member end with a gun grip attached to each tubular member end and a first elastic cord and a second elastic cord. The first and the second inverted L-shaped tubular member may be partially inserted into receiving holes in side walls of a bed-box of a utility terrain vehicle and may be additionally secured to the vehicle via the first and second elastic cord which are attached to the first and second attacher. The gun mounting apparatus for utility terrain vehicles is suitable for transporting at least one weapon securely fastened to the gun grips which are attached to the obliquely oriented tubular member.

20 Claims, 5 Drawing Sheets

UTV GUN MOUNT SYSTEM

CROSS-REFERENCE TO RELATED APPLICATION

The present application is related to and claims priority from prior provisional application Ser. No. 61/304,960, filed Feb. 16, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of support structures for safely carrying weapons and more specifically relates to a gun mounting apparatus for utility terrain vehicles.

2. Description of the Related Art

The use of ATVs and UTVs has become increasingly popular. Given that weapons are often used in outdoor activities, many people install gun racks or gun mounts to their ATVs or UTVs to safely transport their weapons. Weapon racks and mounts for vehicles' prime function is to safely secure and transport weapons. The use of weapon racks and mounts for vehicles may further protect weapons against damage and accidental discharge which may occur if a weapon is not secured during transportation. Weapon racks and mounts should also facilitate uncomplicated, rapid, and hassle free access to the weapon.

Various gun racks and mounts have been proposed for vehicles. Unfortunately, many traditional gun racks that are currently available may be cumbersome and unsafe. Many may take up space in the personal cabin of vehicles, causing passengers to shift uncomfortably to avoid the guns. This also threatens the safety of passengers, as the guns or racks may strike them while vehicles are in motion. Many gun racks may be difficult to install, and may not allow for efficient application and removal of guns. Many gun racks and mounts comprise many parts, making it complicated to install or uninstall them from vehicles and to store them.

Therefore a need exists for a gun mount for a vehicle which comprises few parts, is easy to install, keeps the weapon in a safe and comfortable position for driver and passenger and which simultaneously provides for easy access to the weapon and protects the weapon from accidental discharge and from being scratched or damaged.

Various attempts have been made to solve the above-mentioned problems such as those found in U.S. Pat. Nos. 5,495,969, 3,876,078, 2,251,271, 6,986,446, 7,137,511, and 4,995,537. This prior art is representative of support structures for safely carrying weapons. None of the above inventions and patents, taken either singly or in combination, is seen to describe the invention as claimed.

Ideally, a gun mounting apparatus for utility terrain vehicles should be easy to assemble, comprise few parts, be easy to install and, yet, operates reliably and be manufactured at a modest expense. Thus, a need exists for a reliable UTV Gun Mount System to securely store and transport weapons and to avoid the above-mentioned problems.

BRIEF SUMMARY OF THE INVENTION

In view of the foregoing disadvantages inherent in the known support structures for safely carrying weapons art, the present invention provides a novel UTV Gun Mount System. The general purpose of the present invention, which will be described subsequently in greater detail, is to provide a UTV Gun Mount System for safely carrying weapons.

The present gun mounting apparatus for utility terrain vehicles disclosed herein preferably comprises the following components: a first inverted L-shaped tubular member comprising a first horizontal short section and a first vertical long section; a second inverted L-shaped tubular member comprising a second horizontal short section and a second vertical long section; an obliquely oriented tubular member having a first tubular member end and a second tubular member end; a first hook and a second hook comprising stainless steel eye bolts; a first elastic cord and a second elastic cord comprising a rubber core and polypropylene covering each with a first end and a second end, and two removably attachable weapon grips preferably comprising rubber.

The first inverted L-shaped tubular member, the second inverted L-shaped tubular member and the obliquely oriented tubular member preferably comprise pipes made of ferrous material. The obliquely oriented tubular member is preferably weld-attached to the first inverted L-shaped tubular member at a point near the first tubular member end of the obliquely oriented tubular member and about a midpoint along the first horizontal short section of the first inverted L-shaped tubular member. Further, the obliquely oriented tubular member is weld-attached to the second inverted L-shaped tubular member at a point near the second tubular member end of the obliquely oriented tubular member and about a midpoint along the second horizontal short section of the second inverted L-shaped tubular member. The obliquely oriented tubular member thereby connects the first inverted L-shaped tubular member and the second inverted L-shaped tubular member so that the first inverted L-shaped tubular member and the second inverted L-shaped tubular member are aligned at an oblique angle.

The first vertical long section of the first inverted L-shaped tubular member and the second vertical long section of the second inverted L-shaped tubular member may be partially inserted into receiving holes in side walls of a bed-box of a utility terrain vehicle. The first end of the first elastic cord is attached to the first hook which is situated at the first horizontal short section and the second end of the first elastic cord is connected to the utility terrain vehicle. The second elastic cord is attached to the second hook situated at the second horizontal short section and the second end of the second cable is connected to the utility terrain vehicle. The elastic cords thereby provide additional anchor points for securing the first inverted L-shaped tubular member and the second inverted L-shaped tubular member to the utility terrain vehicle.

The two removably attachable weapon grips preferably comprise rubber and are attached to the first tubular member end and to the second tubular member end of the obliquely oriented tubular member. A gun may preferably be retained within the first and second gun grip. The gun mounting apparatus for utility terrain vehicles thereby is suitable for transporting at least one weapon.

A kit is embodied herein for the UTV Gun Mount System comprising: a first inverted L-shaped tubular member, a second inverted L-shaped tubular member, an obliquely oriented tubular member, a first attacher, a second attacher, a first elastic cord, and a second elastic cord.

In accordance with the embodiments of the present invention a preferred method of use is disclosed herein comprising the steps of: inserting a first vertical long section of a first inverted L-shaped tubular member and a second vertical long section of a second inverted L-shaped tubular member, which are connected via an obliquely oriented tubular member, into receiving holes in side walls of a bed-box of a utility terrain vehicle; attaching a first elastic cord and a second elastic cord which are connected to the first inverted L-shaped tubular member and to the second inverted L-shaped tubular member to the utility terrain vehicle bed-box and thereby providing additional anchor points for securing the first inverted L-shaped tubular member and the second inverted L-shaped tubular member to the utility terrain vehicle; inserting a weapon into a first removably attachable weapon grip and into a second removably attachable weapon grip which are each mounted to a first tubular member end of the obliquely oriented tubular member and a second tubular member end of the obliquely oriented tubular member; securing a weapon to the first removably attachable weapon grip and to the second removably attachable weapon grip via gun grip latches that securely clamp the weapon into the first removably attachable weapon grip and into the second removably attachable weapon grip; transporting the weapon retained within the first removably attachable weapon grip and within the second removably attachable weapon grip; un-securing the weapon from the first removably attachable weapon grip and from the second removably attachable weapon grip; removing the weapon from the first removably attachable weapon grip and from the second removably attachable weapon grip; using the weapon; reinserting the weapon into the first removably attachable weapon grip and into the second removably attachable weapon grip; and re-securing the weapon to the first removably attachable weapon grip and to the second removably attachable weapon grip.

The present invention holds significant improvements and serves as a UTV Gun

Mount System. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, UTV Gun Mount System, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to support structures for safely carrying weapons and more particularly to gun mounting apparatus for utility terrain vehicles 110 as used to safely transport weapons.

Figure 1:
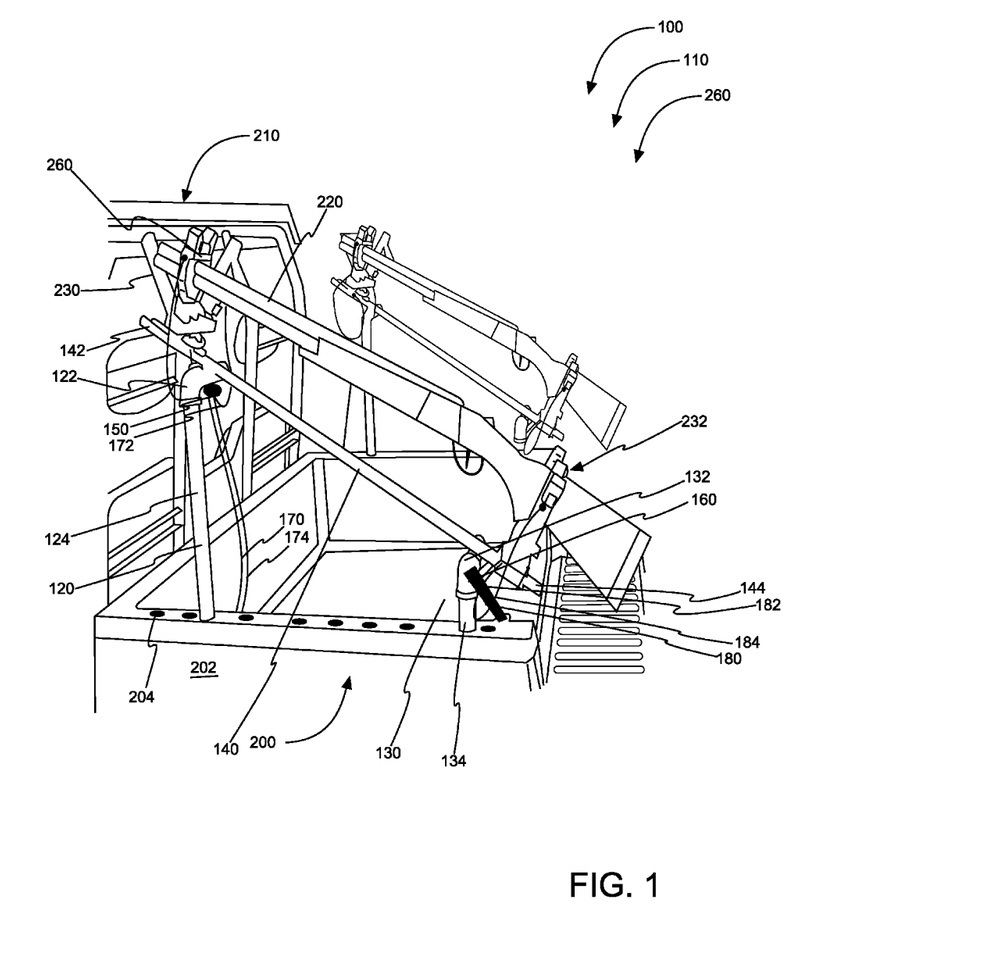
FIG. 1 shows a perspective view illustrating a gun mounting apparatus for utility terrain vehicles in an in-use condition according to an embodiment of the present invention.

Referring to the drawings by numerals of reference there is shown in FIG. 1, a perspective view illustrating gun mounting apparatus for utility terrain vehicles 110 in 'in-use' condition 260 according to an embodiment of the present invention.

The present gun mounting apparatus for utility terrain vehicles 110 preferably comprises first inverted L-shaped tubular member 120 comprising first horizontal short section 122 and first vertical long section 124; second inverted L-shaped tubular member 130 comprising second horizontal short section 132 and second vertical long section 134; obliquely oriented tubular member 140 having a first tubular member end 142 and a second tubular member end 144; first attacher 150 and second attacher 160 comprising stainless steel eye bolts; first elastic cord 170 and second elastic cord 180 comprising a rubber core and polypropylene covering with first end of first elastic cord 172, second end of first elastic cord 174, first end of second elastic cord 182 and second end of second elastic cord 184; and first removably attachable weapon grip 230 and second removably attachable weapon grip 232 preferably comprising rubber.

First vertical long section 124 of first inverted L-shaped tubular member 120 and second vertical long section 134 of second inverted L-shaped tubular member 130, which are preferably connected via obliquely oriented tubular member 140, may be inserted into receiving holes 204 in side walls 202 of bed-box 200 of utility terrain vehicle 210 and first elastic cord 170 and second elastic cord 180 which are connected to first inverted L-shaped tubular member 120 and second inverted L-shaped tubular member 130 may be connected to utility terrain vehicle bed-box 200, thereby providing additional anchor points for securing first inverted L-shaped tubular member 120 and second inverted L-shaped tubular member 130 to utility terrain vehicle 210.

Further, weapon 220 may be inserted into first removably attachable weapon grip 230 and into second removably attachable weapon grip 232 which are each mounted to first tubular member end 142 and second tubular member end 144. Weapon 220 may be secured to first removably attachable weapon grip 230 and to second removably attachable weapon grip 232 via gun grip latches 240 that securely clamp weapon 220 into first removably attachable weapon grip 230 and second removably attachable weapon grip 232. User therefore may transport weapon 220 securely within first removably attachable weapon grip 230 and second removably attachable weapon grip 232 thereby creating in-use condition 260.

Figure 2:
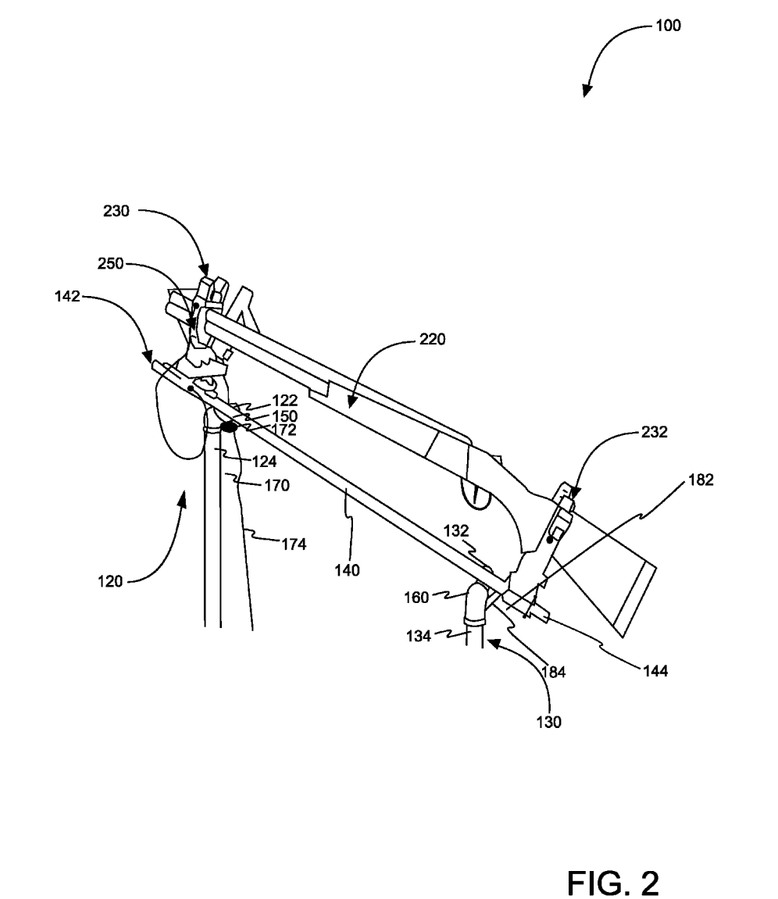
FIG. 2 is a perspective view illustrating the gun mounting apparatus for utility terrain vehicles according to an embodiment of the present invention of FIG. 1.

Referring now to FIG. 2, a perspective view illustrating gun mounting apparatus for utility terrain vehicles 110 according to an embodiment of the present invention of FIG. 1.

Gun mounting apparatus for utility terrain vehicles 110 preferably comprises first inverted L-shaped tubular member 120 comprising first horizontal short section 122 and first vertical long section 124, second inverted L-shaped tubular member 130 comprising second horizontal short section 132 and second vertical long section 134, and obliquely oriented tubular member 140 which preferably comprise pipes made of ferrous material. However, each of the aforementioned components may comprise any kind of durable and suitable material, such as stainless steel or plastic.

First inverted L-shaped tubular member 120 comprising first horizontal short section 122 and first vertical long section 124, and second inverted L-shaped tubular member 130 comprising second horizontal short section 132 and second vertical long section 134 preferably have a diameter of approximately one inch, while obliquely oriented tubular member 140 preferably has a diameter of ½ inch. First horizontal short section 122 and second horizontal short section 132 preferably measure 8½ inches in length, while first vertical long section 124 preferably measures 21½ inches in length, second vertical long section 134 preferably measures 8½ inches in length, and obliquely oriented tubular member 140 preferably measures 41½ inches in length. However, the exact measurements may vary depending on the type of utility terrain vehicle 210. The measurements may further vary depending on the size of the bed-box 200 of the applicable utility terrain vehicle 210, the size of receiving holes 204 and the distance between receiving holes 204.

Obliquely oriented tubular member 140 is preferably weld-attached to first inverted L-shaped tubular member 120 at a point near first tubular member end 142 of obliquely oriented tubular member 140 and about a midpoint along first horizontal short section 122 of first inverted L-shaped tubular member 120. Obliquely oriented tubular member 140 is further weld-attached to second inverted L-shaped tubular member 130 at a point near second tubular member end 144 of obliquely oriented tubular member 140 and at about a midpoint along second horizontal short section 132 of second inverted L-shaped tubular member 130 and thereby connects first inverted L-shaped tubular member 120 and second inverted L-shaped tubular member 130 so that first inverted L-shaped tubular member 120 and second inverted L-shaped tubular member 130 are aligned at an oblique angle. First inverted L-shaped tubular member 120 is longer than second inverted L-shaped tubular member 130 and is preferably situated closer to the front of the utility terrain vehicle 210 than second inverted L-shaped tubular member 130. The length of first inverted L-shaped tubular member 120 is greater than the length of second inverted L-shaped tubular member 130 resulting in oblique orientation of obliquely oriented tubular member 140 and of the mounted weapon 220. The lower ends of first inverted L-shaped tubular member 120 and of second inverted L-shaped tubular member 130 are at the same horizontal level and may be inserted into receiving holes 204 of utility terrain vehicle 210.

In an alternative embodiment, first inverted L-shaped tubular member 120, second inverted L-shaped tubular member 130, and obliquely oriented tubular member 140 preferably are assembleable and disassembleable as a 3 piece modular connecting system. In yet another alternative embodiment first horizontal short section 122, first vertical long section 124, second horizontal short section 132, second vertical long section 134, and obliquely oriented tubular member 140 are assembleable and disassembleable as a 5-piece modular connecting system.

The 3- and 5-piece modular connecting systems comprise fasteners at the connection points of first horizontal short section 122, first vertical long section 124, second horizontal short section 132, second vertical long section 134, and obliquely oriented tubular member 140. The fasteners preferably comprise nuts and bolts. In another embodiment, the fasteners may comprise threadable attachers so that the various parts may be screwed together. However, fasteners may comprise any kind of suitable fastening mechanism such as clip or hook mechanisms. Gun mounting apparatus for utility terrain vehicles 110 thereby comprises a modular connecting system which is easy to assemble. UTV Gun Mount System 100 has few components which makes UTV Gun Mount System 100 easily storable when it is removed from a utility terrain vehicle 210.

Gun mounting apparatus for utility terrain vehicles 110 preferably comprises first attacher 150 and second attacher 160. First attacher 150 is preferably situated at first horizontal short section 122 and second attacher 160 is preferably situated at second horizontal short section 132. First attacher 150 and second attacher 160 preferably comprise stainless steel eye bolts.

Gun mounting apparatus for utility terrain vehicles 110 further comprises first elastic cord 170 and second elastic cord 180 preferably comprising a rubber core and polypropylene covering. Karabiner hooks are situated at first end of first elastic cord 172, second end of first elastic cord 174, first end of second elastic cord 182, and second end of second elastic cord 184. First end of first elastic cord 172 is attached to first attacher 150 via a karabiner hook and second end of first elastic cord 174 is connected to bed-box 200 of utility terrain vehicle 210 via a karabiner hook; first end of second elastic cord 182 is attached to second attacher 160 via a karabiner hook and second end of second elastic cord 184 is connected to utility terrain vehicle 210 via a karabiner hook so as to provide additional anchor points for securing first inverted L-shaped tubular member 120 and second inverted L-shaped tubular member 130 to utility terrain vehicle 210.

Figure 3:
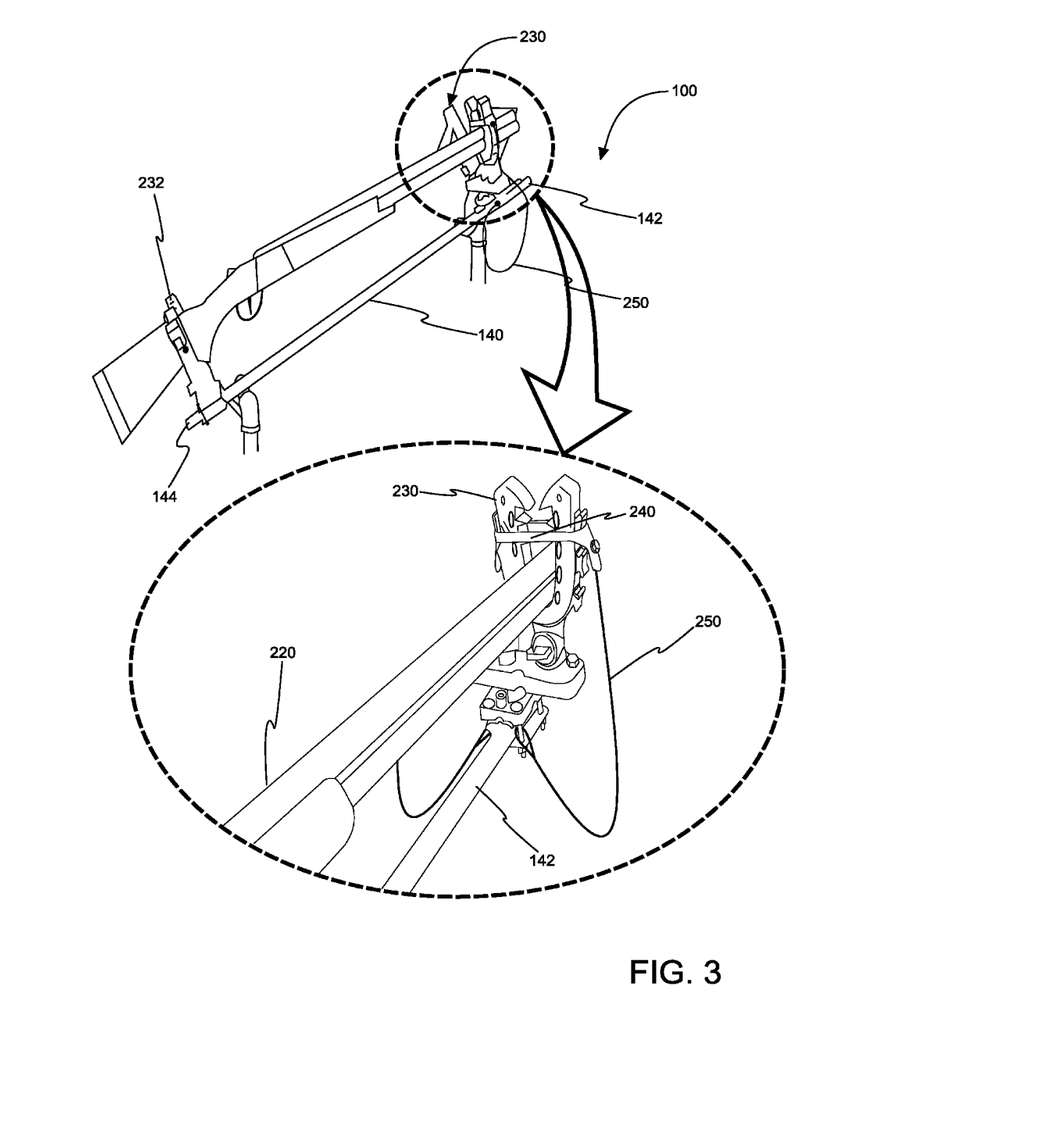
FIG. 3 is a perspective view illustrating removably attachable weapon grips according to an embodiment of the present invention of FIGS. 1 and 2.
Figure 4:
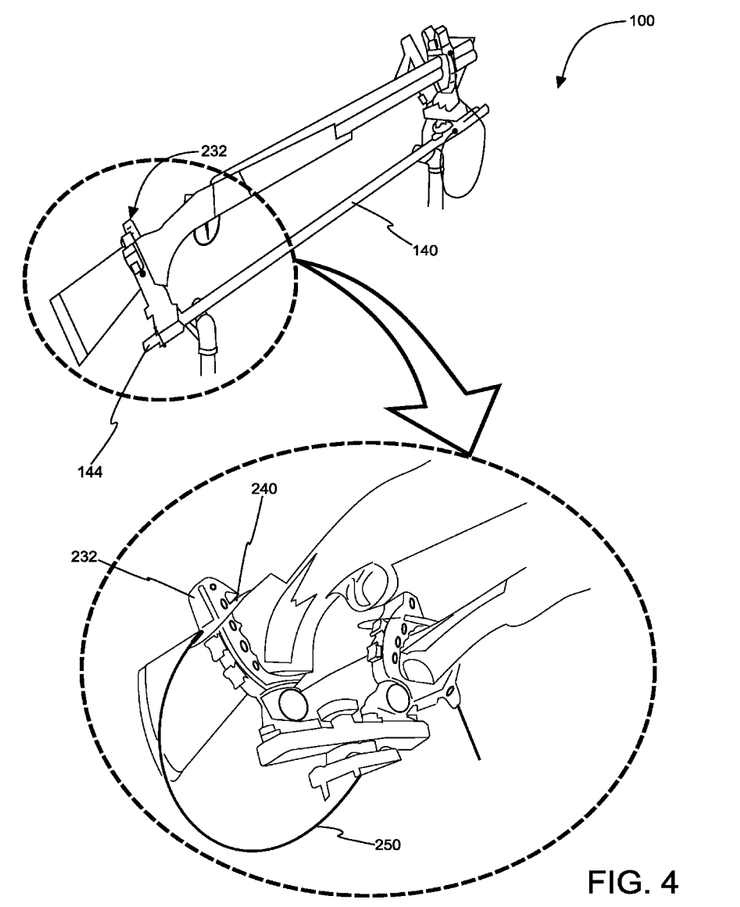
FIG. 4 is a perspective view illustrating removably attachable weapon grips according to an embodiment of the present invention of FIGS. 1-3.

Referring now to FIG. 3 and FIG. 4, perspective views illustrating removably attachable weapon grips according to an embodiment of the present invention of FIGS. 1 and 2.

First removably attachable weapon grip 230 may be attached to first tubular member end 142 and second removably attachable weapon grip 232 may be attached to second tubular member end 144 of obliquely oriented tubular member 140. First removably attachable weapon grip 230 and second removably attachable weapon grip 232 preferably comprise prefabricated rubber grips with rubber fins on the gripping surface which are typically used to hold equipment like firearms. The rubber fin grips preferably comprise gun grip closing latches 240 which are attached to the grips via cables 250 to prevent the loss of the closing latches when not utilized to secure the weapon 220 in the grips. First removably attachable weapon grip 230 and second removably attachable weapon grip 232 may preferably be attached to obliquely oriented tubular member 140 with nuts and bolts. UTV Gun Mount System 100 preferably comprises a set of two removably attachable weapon grips mounted to first tubular member end 142 and a set of two removably attachable weapon grips mounted to second tubular member end 144, so that two firearms may be secured to gun mounting apparatus for utility terrain vehicles 110. First removably attachable weapon grip 230 and second removably attachable weapon grip 232 may preferably comprise a joint which allows first removably attachable weapon grip 230 and second removably attachable weapon grip 232 to move sideways so that weapon 220 may be held at various angles.

UTV Gun Mount System 100 may be sold as kit 400 comprising the following parts: at least one first inverted L-shaped tubular member 120; at least one second inverted L-shaped tubular member 130; at least one obliquely oriented tubular member 140; first attacher 150; second attacher 160; first elastic cord 170; second elastic cord 180; and at least one set of user instructions. UTV Gun Mount System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
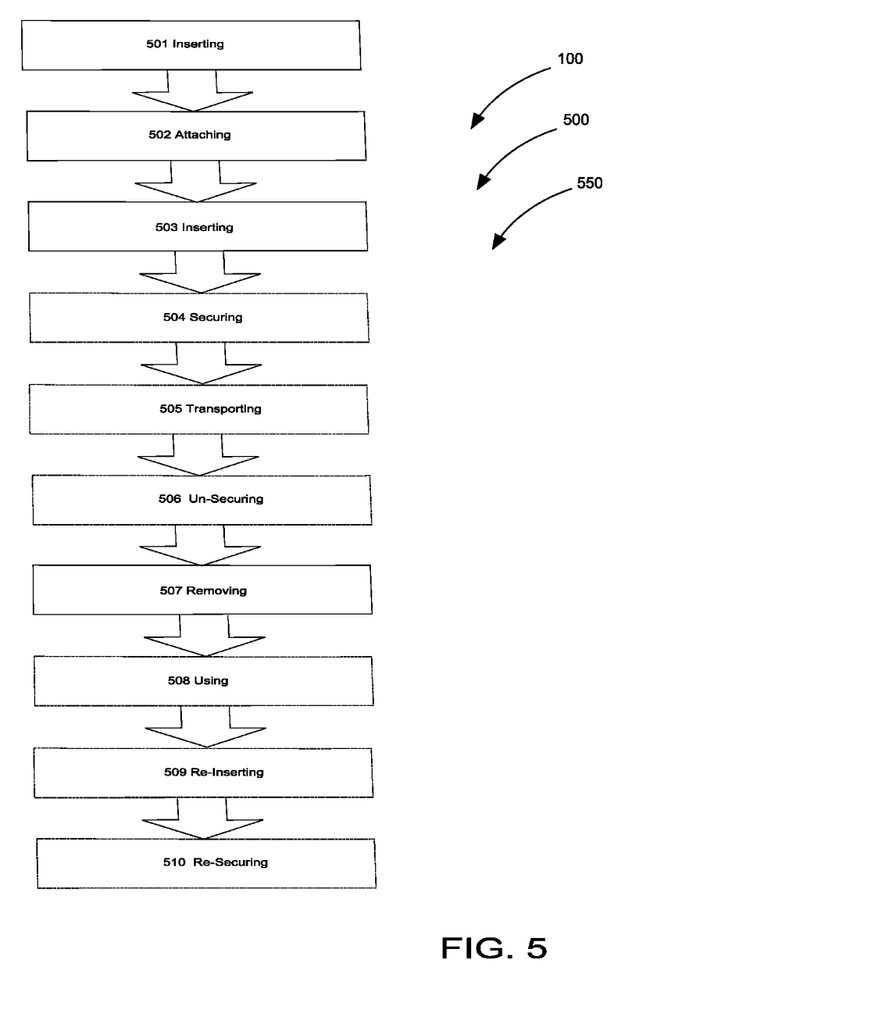
FIG. 5 is a flowchart illustrating a method of use according to an embodiment of the present invention of FIGS. 1-4.

Referring now to FIG. 5, flowchart 550 illustrating method of use 500 according to an embodiment of the present invention of FIGS. 1-4.

In accordance with the embodiments of the present invention a preferred method of use 500 is disclosed herein comprising: step one 501 inserting first vertical long section 124 of first inverted L-shaped tubular member 120 and second vertical long section 134 of a second inverted L-shaped tubular member 130, which are connected via obliquely oriented tubular member 140, into receiving holes 204 of utility terrain vehicle bed-box 200; step two 502 attaching first elastic cord 170 and second elastic cord 180 which are connected to first inverted L-shaped tubular member 120 and second inverted L-shaped tubular member 130 to utility terrain vehicle bed-box 200 and thereby providing additional anchor points for securing first inverted L-shaped tubular member 120 and second inverted L-shaped tubular member 130 to utility terrain vehicle 210; step three 503 inserting weapon 220 into first removably attachable weapon grip 230 and into second removably attachable weapon grip 232 which are each mounted to first tubular member end 142 of obliquely oriented tubular member 140 and second tubular member end 144 of obliquely oriented tubular member 140; step four 504 securing weapon 220 to first removably attachable weapon grip 230 and to second removably attachable weapon grip 232 via gun grip latches 240 that securely clamp weapon 220 into first removably attachable weapon grip 230 and into second removably attachable weapon grip 232; step five transporting weapon 220 retained within first removably attachable weapon grip 230 and second removably attachable weapon grip 232; step six 506 un-securing weapon 220 from first removably attachable weapon grip 230 and second removably attachable weapon grip 232; step seven 507 removing weapon 220 from first removably attachable weapon grip 230 and second removably attachable weapon grip 232; step eight 508 using weapon 220; step nine reinserting weapon 220 into first removably attachable weapon grip 230 and second removably attachable weapon grip 232; and step ten 510 re-securing weapon 220 to first removably attachable weapon grip 230 and second removably attachable weapon grip 232.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A gun mounting apparatus for utility terrain vehicles comprising:
    a first inverted L-shaped tubular member comprising a first horizontal short section and a first vertical long section;
    a second inverted L-shaped tubular member comprising a second horizontal short section and a second vertical long section;
    an obliquely oriented tubular member having a first tubular member end and a second tubular member end;
    a first attacher and a second attacher;
    a first elastic cord and a second elastic cord each with a first end and a second end;
    wherein said obliquely oriented tubular member is weld-attached to said first inverted L-shaped tubular member at a point near said first tubular member end of said obliquely oriented tubular member and about a midpoint along said first horizontal short section of said first inverted L-shaped tubular member;
    wherein said obliquely oriented tubular member is weld-attached to said second inverted L-shaped tubular member at a point near said second tubular member end of said obliquely oriented tubular member and about a midpoint along said second horizontal short section of said second inverted L-shaped tubular member;
    wherein said obliquely oriented tubular member connects said first inverted L-shaped tubular member and said second inverted L-shaped tubular member so that said first inverted L-shaped tubular member and said second inverted L-shaped tubular member are aligned at an oblique angle relative to the first vertical long section and the second vertical long section;
    wherein said first vertical long section of said first inverted L-shaped tubular member and said second vertical long section of said second inverted L-shaped tubular member may be partially inserted into receiving holes in side walls of a bed-box of a utility terrain vehicle;
    wherein said first end of said first elastic cord is attached to said first attacher which is situated at said first horizontal short section and said second end of said first elastic cord is connected to said utility terrain vehicle;
    wherein said second elastic cord is attached to said second attacher situated at said second horizontal short section and said second end of said second cable is connected to said utility terrain vehicle; and
    wherein said gun mounting apparatus for utility terrain vehicles is suitable for transporting at least one weapon.

2. The gun mounting apparatus for utility terrain vehicles of claim 1 wherein said first inverted L-shaped tubular member, said second inverted L-shaped tubular member and said obliquely oriented tubular member comprise pipes made of ferrous material.

3. The gun mounting apparatus for utility terrain vehicles of claim 2 wherein said first inverted L-shaped tubular member, said second inverted L-shaped tubular member and said obliquely oriented tubular member comprise pipes made of wrought iron.

4. The gun mounting apparatus for utility terrain vehicles of claim 1 wherein said first attacher and said second attacher comprise hooks.

5. The gun mounting apparatus for utility terrain vehicles of claim 4 wherein said hooks comprise stainless steel eye bolts.

6. The gun mounting apparatus for utility terrain vehicles of claim 1 wherein said first elastic cord and said second elastic cord comprise a rubber core and polypropylene covering.

7. The gun mounting apparatus for utility terrain vehicles of claim 1 wherein said first inverted L-shaped tubular member, said second inverted L-shaped tubular member, and said obliquely oriented tubular member are assembleable and disassembleable as a 3 piece modular connecting system.

8. The gun mounting apparatus for utility terrain vehicles of claim 7 wherein said connecting system comprises fasteners.

9. The gun mounting apparatus for utility terrain vehicles of claim 8 wherein said fasteners comprise nuts and bolts.

10. The gun mounting apparatus for utility terrain vehicles of claim 8 wherein said fasteners comprise threadable attachers.

11. The gun mounting apparatus for utility terrain vehicles of claim 1 wherein said first horizontal short section, said first vertical long section, said second horizontal short section, said second vertical long section, and said obliquely oriented tubular member are assembleable and disassembleable as a 5-piece modular connecting system.

12. The gun mounting apparatus for utility terrain vehicles of claim 11 wherein said connecting system comprises fasteners.

13. The gun mounting apparatus for utility terrain vehicles of claim 12 wherein said fasteners comprise nuts and bolts.

14. The gun mounting apparatus for utility terrain vehicles of claim 12 wherein said fasteners comprise threadable attachers.

15. The gun mounting apparatus for utility terrain vehicles of claim 1 further comprising two removably attachable weapon grips which are attached to said first tubular member end and to said second tubular member end of said obliquely oriented tubular member.

16. The gun mounting apparatus for utility terrain vehicles of claim 15 wherein said removably attachable weapon grips comprise rubber.

17. The gun mounting apparatus for utility terrain vehicles of claim 16 wherein said weapon comprises a firearm.

18. A gun mounting apparatus for utility terrain vehicles comprising:
   a first inverted L-shaped tubular member comprising a first horizontal short section and a first vertical long section;
   a second inverted L-shaped tubular member comprising a second horizontal short section and a second vertical long section;
   an obliquely oriented tubular member having a first tubular member end and a second tubular member end;
   a first attacher and a second attacher comprising stainless steel eye bolts;
   a first elastic cord and a second elastic cord comprising a rubber core and polypropylene covering each with a first end and a second end;
   two removably attachable weapon grips comprising rubber which are attached to said first tubular member end and to said second tubular member end of said obliquely oriented tubular member;
   wherein said first inverted L-shaped tubular member, said second inverted L-shaped tubular member and said obliquely oriented tubular member comprise pipes made of ferrous material;
   wherein said obliquely oriented tubular member is weld-attached to said first inverted L-shaped tubular member at a point near said first tubular member end of said obliquely oriented tubular member and about a midpoint along said first horizontal short section of said first inverted L-shaped tubular member;
   wherein said obliquely oriented tubular member is weld-attached to said second inverted L-shaped tubular member at a point near said second tubular member end of said obliquely oriented tubular member and about a midpoint along said second horizontal short section of said second inverted L-shaped tubular member;
   wherein said obliquely oriented tubular member connects said first inverted L-shaped tubular member and said second inverted L-shaped tubular member so that said first inverted L-shaped tubular member and said second inverted L-shaped tubular member are aligned at an oblique angle relative to the first vertical long section and the second vertical long section;
   wherein said first vertical long section of said first inverted L-shaped tubular member and said second vertical long section of said second inverted L-shaped tubular member may be partially inserted into receiving holes in side walls of a bed-box of a utility terrain vehicle;
   wherein said first end of said first elastic cord is attached to said first hook which is situated at said first horizontal short section and said second end of said first elastic cord is connected to said utility terrain vehicle;
   wherein said second elastic cord is attached to said second hook situated at said second horizontal short section and said second end of said second cable is connected to said utility terrain vehicle; and
   wherein said gun mounting apparatus for utility terrain vehicles is suitable for transporting at least one weapon.

19. The gun mounting apparatus for utility terrain vehicles of claim 18 wherein said gun mounting apparatus for utility terrain vehicles further comprises a kit including said first inverted L-shaped tubular member, said second inverted L-shaped tubular member, said obliquely oriented tubular member, said first attacher, said second attacher, said first elastic cord, and said second elastic cord.

20. A method of use comprising the steps of:
   inserting a first vertical long section of a first inverted L-shaped tubular member and a second vertical long section of a second inverted L-shaped tubular member, which are connected via an obliquely oriented tubular member, into receiving holes in side walls of a bed-box of a utility terrain vehicle, the obliquely oriented tubular member oriented at an oblique angle relative to the first vertical long section and the second vertical long section;
   attaching a first elastic cord and a second elastic cord which are connected to said first inverted L-shaped tubular member and said second inverted L-shaped tubular member to said utility terrain vehicle bed-box and thereby providing additional anchor points for securing said first inverted L-shaped tubular member and said second inverted L-shaped tubular member to said utility terrain vehicle;

inserting a weapon into a first removably attachable weapon grip and into a second removably attachable weapon grip which are each mounted to a first tubular member end of said obliquely oriented tubular member and a second tubular member end of said obliquely oriented tubular member;

securing a weapon to said first removably attachable weapon grip and to said second removably attachable weapon grip via gun grip latches that securely clamp said weapon into said first removably attachable weapon grip and into said second removably attachable weapon grip;

transporting said weapon retained within said first removably attachable weapon grip and within said second removably attachable weapon grip;

un-securing said weapon from said first removably attachable weapon grip and from said second removably attachable weapon grip;

removing said weapon from said first removably attachable weapon grip and from said second removably attachable weapon grip;

using said weapon;

reinserting said weapon into said first removably attachable weapon grip and into said second removably attachable weapon grip; and re-securing said weapon to said first removably attachable weapon grip and to said second removably attachable weapon grip.

* * * * *